(12) United States Patent
Basile et al.

(10) Patent No.: US 7,329,691 B2
(45) Date of Patent: Feb. 12, 2008

(54) PEROVSKITE CATALYST FOR THE PARTIAL OXIDATION OF NATURAL GAS

(75) Inventors: Francesco Basile, Catanzaro (IT); Giuseppe Fornasari, Bologna (IT); Angelo Vaccari, Bologna (IT); Pascal Del Gallo, Dourdan (FR); Daniel Gary, Montigny le Bretonneux (FR)

(73) Assignee: L'Air Liquid, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 566 days.

(21) Appl. No.: 10/712,691

(22) Filed: Nov. 13, 2003

(65) Prior Publication Data
US 2004/0127351 A1  Jul. 1, 2004

(30) Foreign Application Priority Data
Nov. 15, 2002  (EP)  .................. 02292851

(51) Int. Cl.
C07C 27/06 (2006.01)
C07C 27/00 (2006.01)
B01J 23/00 (2006.01)
B01J 23/40 (2006.01)
B01J 23/42 (2006.01)

(52) U.S. Cl. ............ 518/703; 518/716; 502/302; 502/303; 502/304; 502/326; 502/337

(58) Field of Classification Search .......... 502/335, 502/337, 326, 302–304; 518/703, 716
See application file for complete search history.

(56) References Cited

U.S. PATENT DOCUMENTS

| 4,110,254 A | * | 8/1978 | Lauder | 502/303 |
|---|---|---|---|---|
| 4,110,258 A | * | 8/1978 | Lauder | 502/306 |
| 4,134,852 A | * | 1/1979 | Volin | 502/302 |
| 4,182,694 A | * | 1/1980 | Lauder | 502/303 |
| 4,237,032 A | * | 12/1980 | Evans et al. | 502/303 |
| 4,312,955 A | | 1/1982 | Bartley | |
| 4,321,250 A | | 3/1982 | Hart | |
| 4,861,802 A | * | 8/1989 | McCann | 518/717 |

(Continued)

FOREIGN PATENT DOCUMENTS

GB  1 511 333 A  5/1978

(Continued)

OTHER PUBLICATIONS

European Search Report EP 02 29 2851.

(Continued)

Primary Examiner—Cam N. Nguyen
(74) Attorney, Agent, or Firm—Elwood Haynes

(57) ABSTRACT

A composition and method for a Catalytic Partial Oxidation (CPO) of methane to synthesis gas. The catalyst allows the process to proceed at low residence time providing a long time thermal stability. The perovskite structure $[A_zA'_{1-z}][B_{1-x-y}Ni_xRh_y]O_{3-\delta}$ of the catalyst is obtained using mainly La, Sr, as A and A' cation sites (A, A': actinide and/or lanthanide, elements and/or elements from Group I and II) and mainly Fe, Ni, as B cation sites (B: transition metal element and/or element from Group III to V).

34 Claims, 2 Drawing Sheets

U.S. PATENT DOCUMENTS

| | | | |
|---|---|---|---|
| 4,863,971 A * | 9/1989 | Broussard et al. | 518/713 |
| 5,149,516 A | 9/1992 | Han et al. | |
| 5,403,461 A * | 4/1995 | Tuller et al. | 204/252 |
| 5,447,705 A * | 9/1995 | Petit et al. | 423/418.2 |
| 6,110,861 A | 8/2000 | Krumpelt et al. | |
| 6,395,675 B1 * | 5/2002 | Suga et al. | 502/326 |
| 6,409,940 B1 * | 6/2002 | Gaffney et al. | 252/373 |
| 6,770,256 B1 * | 8/2004 | Kaliaguine et al. | 423/593.1 |
| 2003/0155254 A1 * | 8/2003 | Mazanec et al. | 205/633 |
| 2004/0204315 A1 * | 10/2004 | Krumpelt et al. | 502/303 |

FOREIGN PATENT DOCUMENTS

| | | |
|---|---|---|
| JP | 07 308578 A | 11/1995 |
| WO | WO 01 60742 | 8/2001 |

OTHER PUBLICATIONS

Patent Abstracts of Japan, Mar. 29, 1996, Japan.

* cited by examiner

PEROVSKITE CATALYST FOR THE PARTIAL OXIDATION OF NATURAL GAS

CROSS REFERENCE TO RELATED APPLICATION

This application claims the benefit of priority under 35 U.S.C. § 119 (a) and (b) to European Patent Office (EPO) Application No. 02 292 851.9, filed Nov. 15, 2002, the entire contents of which are incorporated herein by reference

BACKGROUND OF THE INVENTION

1. Field of the Invention

The present invention relates to a new catalysts for the partial oxidation of hydrocarbons.

2. Related Art

The catalytic partial oxidation of hydrocarbons (CPO), natural gas or methane to synthesis gas resulting in mixtures of hydrogen ($H_2$) and carbon monoxide (CO) in various proportions, has been processed for many years. While currently limited as an industrial process, the partial oxidation is also of interest for the significant released heat and for the use of smaller reactors. More particularly, the partial oxidation of methane at short residence time is a goal to reach synthesis gas using an alternative process to the steam reforming process, which is today the most popular one.

Synthesis gas can be used as feed for fuel cell or as a reducing atmosphere in the metallurgic industry but it is mainly the key step for activation of methane for the indirect production of methanol and middle distillate in the petrochemical and chemical industries.

The advantage of the catalytic partial oxidation of methane is mainly its strong exothermic character in the short residence time. Both parameters allow producing synthesis gas with lower investment cost without delivering large quantities of external energy.

Nevertheless, because this strong exothermic character of the total oxidation reactions, the temperature of the catalytic bed reaches more than well above 1000° C.

There is thus a need for very stable catalyst in terms of metal sintering and support resistance.

Furthermore, as the catalyst activity affects the thermal profile of the reactor, a careful modulation is therefore required to avoid hot spot in the reactor which can light on the homogeneous reaction.

A novel approach relates to the possibility of introducing the metal in the crystallographic structure of a given material and then to activate the catalyst by reducing the metal "in situ" or under hydrogen flow. This allows in some case to develop a strong interaction between metal and surface, Some of these catalysts have a Perovskite structure.

U.S. Pat. No. 5,149,516 discloses the partial oxidation of methane to produce carbon monoxide and hydrogen using a Perovskite catalyst, such as $LaCoO_3$.

U.S. Pat. No. 5,447,705 discloses a catalyst for the partial oxidation of methane or of a gaseous mixture containing methane, said catalyst preferably having a Perovskite structure with LaFeNi as a cation composition. However, in the reported examples it is very difficult to balance the structure stability. On one hand, if the reducible metal (Ni and Co) is present in large amount, the structure is completely reduced and the Perovskite structure becomes unstable. On the other hand, if the reducible cation is present in low amount, the catalytic activity is poor and does not allow to work with short residence time.

U.S. Pat. No. 6,110,861 discloses a two-part catalyst comprising a dehydrogenation portion and an oxide-ion conducting portion.

WO 0160742 discloses a catalysts and a processes for the catalytic conversion of hydrocarbons to carbon monoxide and hydrogen employing new families of chromium-rare earth based catalysts.

Today, none of the existing catalytic partial oxidation processes is able to provide a sufficiently high conversion of the reactant gas together with a high selectivity of CO and $H_2$ reaction products, without using high quantities of rare and costly catalysts, nor without experiencing adverse effects such as an excessive coking of the catalyst, or a premature catalyst failure by its lack of heat resistance or by its mechanical instability or even by the mechanical instability of its structure.

That is why there is a continuing need for new catalysts that are mechanically stable and retains a high level of activity and selectivity to CO and $H_2$ products under conditions of high temperature, without excessive coking.

The inventors have found that the catalysts of the present invention overcome some of these drawbacks.

SUMMARY OF THE INVENTION

Accordingly, the present invention provides a composition characterized in that it essentially consists in a solid solution of a mixture of at least a perovskite crystallographic structure with nickel and/or rhodium metal.

The composition as defined above is more particularly represented by the general formula (I):

$$[A_zA'_{1-z}][B_{1-x-y}Ni_xRh_y]O_{3-\delta} \qquad (I)$$

wherein:

A and A' are different and are selected from the Lanthanide or the Actinide families or from the group $II_a$ of the Mendeleev's periodical table of elements;

B is selected from the transition metal groups of columns IIIb, IVb, Vb, VIb, VIIB, Ib and IIb and group VIIIb of the Mendeleev's periodical table of elements;

$0 < x \leq 0.7$, $0 \leq y \leq 0.5$, $0 \leq x+y \leq 0.8$, $0 \leq z \leq 1$ and $\delta$ is the sub stoichiometric value of oxygen to obtain the electric neutrality of the Perovskite compound.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

According to one particular aspect the invention A and A' are independently chosen from La, Ce, Ca or Sr. A is preferably La.

According to another particular aspect of the invention, B is chosen from Mn, Fe, Co or Al.

The invention is more particularly relates a composition, characterized in that it is represented by the formula (Ia):

$$[La_zA'_{1-z}][Fe_{1-x-y}Ni_xRh_y]O_{3-\delta} \qquad (Ia)$$

wherein A', x, y, and z and δ are as hereinabove defined for the formula (I).

Among the compounds represented by the formula (Ia), those represented by the formula (Ib):

$$[La_zCe_{1-z}][Fe_{1-x-y}Ni_xRh_y]O_{3-\delta} \qquad (Ib)$$

wherein x, y, and z and δ are as hereinabove defined for the formula (I), are preferred.

According to a preferred aspect of the invention, in the formulas (I) (Ia) or (Ib), $0 \leq x \leq 0.5$.

According to another preferred aspect of the invention, in the formulas (I) (Ia) or (Ib), $0 < y \leq 0.25$ and $z < 1$.

The invention more spefically consists in the following compositions:

La $Fe_{0.7}$ $Ni_{0.25}$ $Rh_{0.05}$ $O_{3-\delta}$
$La_{0.8}$ $Ce_{0.2}$ $Fe_{0.7}$ $Ni_{0.25}$ $Rh_{0.05}$ $O_{3-\delta}$
$La_{0.8}$ $Ce_{0.2}$ $Fe_{0.7}$ $Ni_{0.3}$ $O_{3-\delta}$ While two composition have been selected for comparison La $Fe_{0.7}$ $Ni_{0.3}$ $O_{3-\delta}$
La $Fe_{0.95}$ $Rh_{0.05}$ $O_{3-\delta}$ According to another aspect of the present invention, the composition as defined as herein above, is used as a catalyst of the partial oxydation of natural gas and/or light hydrocarbons to synthesis gas, as a catalyst of the steam and/or dry reforming of natural gas and/or light hydrocarbons ($C_2$-$C_4$) to synthesis gas and/or selective oxidations.

By light hydrocarbons, those which have a carbon chain containing from two to four carbon atoms ($C_2$-$C_4$), are more sepecifically within the scope of the present invention.

The composition of the invention are more specifically worked on in the operating catalyst temperature conditions in the range of 500 to 1300° C. and preferably between 600 to 1100° C., and/or in the operating catalyst pressure conditions in the range of $10^5$ Pa to $3 \cdot 10^6$ Pa and preferably between $10^5$ Pa to $10^6$ Pa.

In the use herein before mentioned uses, the oxydant gaseous feed is of any kind; it is preferably pure oxygen, oxygen and inert gas mixture, steam, carbon dioxide or a mixture of part or/and all of them.

According to another aspect the present invention, the composition as defined as herein above, is used as a catalyst of hydrogenation reactions or as a catalyst of dehydrogenated oxydative reactions.

The following examples illustrate the present invention without limiting it.

EXAMPLES

Example 1

$LaFe_{0.7}Ni_{0.25}Rh_{0.05}O_3$ (Invention)

Figure 1:
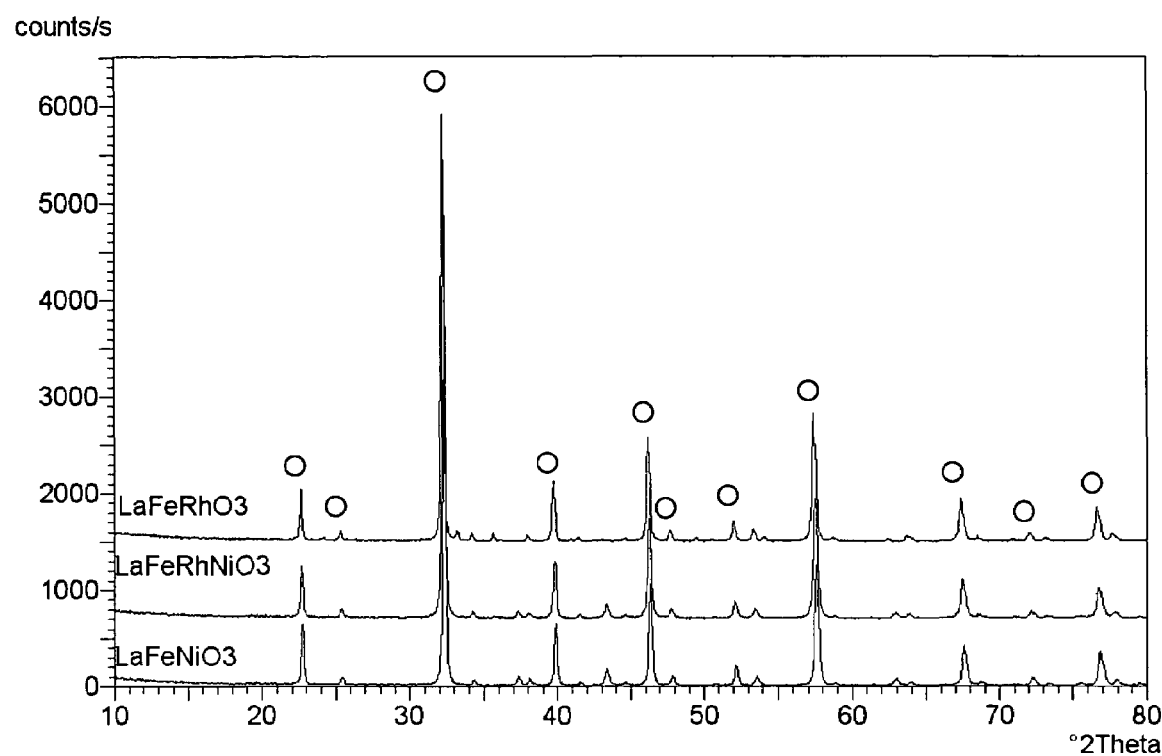
FIG. 1 discloses XRD patterns of $LaFe_{1-x}M_xO_3$ catalysts after calcination at 900° C.

5.3 g of $La(NO_3)_3$, 4.6 g of $Fe(NO_3)_3$, 1.2 g of $Ni(NO_3)_2$ and 0.83 g of Rh nitrate solution 10% w/w are dissolved in 300 ml of distilled water and slowly dropped in a solution containing 7.7 g of citric acid dissolved in 400 ml of ethylene glycol. After mixing, the resulting solution are heated at 90° C. for 4 h. The evaporation of water from the solution brings to the formation of a sol (colloidal solution with micrometric micelles). The catalyst is dried in oven at 90° C. then the oven temperature is increased to 180° C. over night. In this step, a gel is formed and dried. The obtained solid is calcined at 500° C. for 4 h and then at 900° C. for 12 h. The XRD shows the perovskite cubic pattern (FIG. 1) and the surface area after calcination is 8 m²/g. FIG. 1 discloses XRD patterns of $LaFe_{1-x}M_xO_3$ catalysts after calcination at 900° C. ($M_x=Ni_{0.3}$, $Ni_{0.25}Rh_{0.05}$ or $Rh_{0.05}$). (O) $LaFeMO_3$ perovskite structure.

Example 2

$La_{0.8}Ce_{0.2}Fe_{0.7}Ni_{0.25}Rh_{0.05}O_3$ (Invention)

Figure 2:
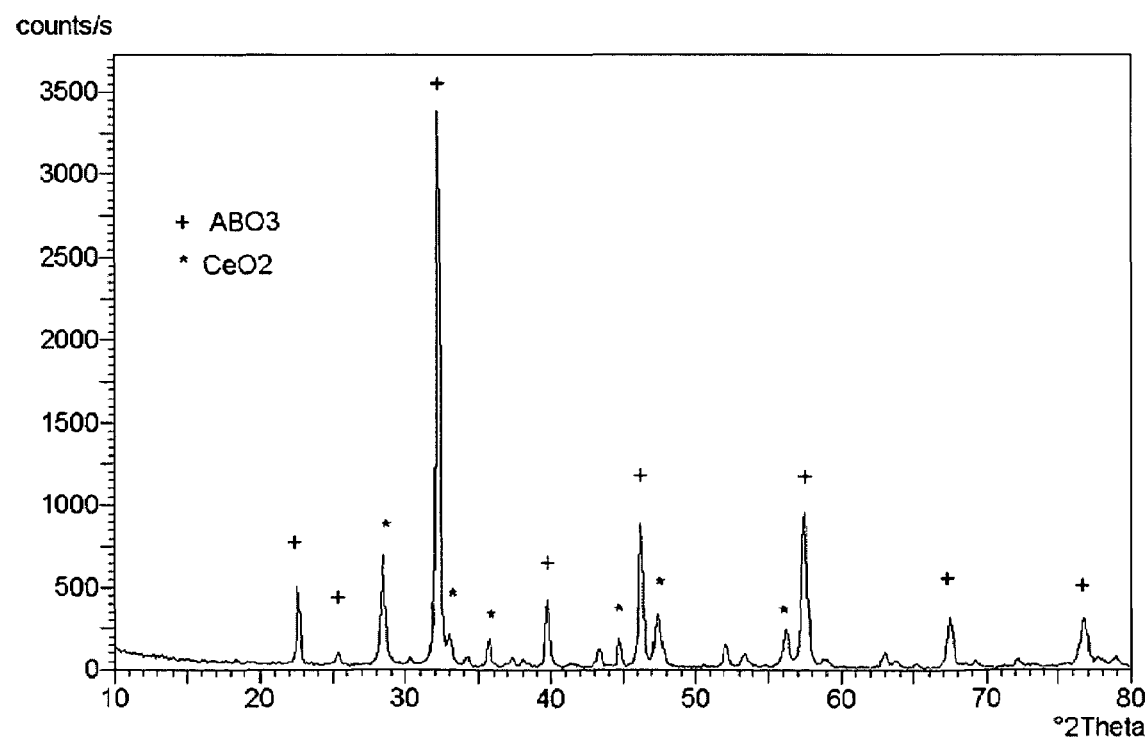
FIG. 2 discloses XRD patterns of  $La_{0.8}Ce_{0.2}Fe_{0.7}Ni_{0.25}Rh_{0.05}O_3$ catalysts after calcination at 900° C.

5.3 g of $La(NO_3)_3$, 1.8 g $Ce(NO_3)_3$, 5.7 g of $Fe(NO_3)_3$, 1.5 g of $Ni(NO_3)_2$ and 1.0 g of Rh nitrate solution 10% w/w are dissolved in 400 ml of distilled water and slowly dropped in a solution containing 9.5 g of citric acid dissolved in 500 ml of ethylene glycol. After mixing, the resulting solution is heated at 90° C. for 4 h. The evaporation of water from the solution brings to the formation of a sol (colloidal solution with micrometric micelles). The catalyst is dried in oven at 90° C. then the oven temperature is increased to 180° C. over night. In this step, a gel is formed and dried. The obtained solid is calcined at 500° C. for 4 h and then at 900° C. for 12 h. The XRD shows the perovskite cubic pattern and the reflection of the $CeO_2$ phase (FIG. 2). The surface area after calcination is 10 m²/g. FIG. 2 discloses XRD patterns of $La_{0.8}Ce_{0.2}Fe_{0.7}Ni_{0.25}Rh_{0.05}O_3$ catalysts after calcination at 900° C./(+) $ABO_3$ perovskite structure, (*) $CeO_2$ compound.

Example 3

$LaFe_{0.7}Ni_{0.3}O_3$ (Comparative Example)

5.3 g of $La(NO_3)_3$, 4.7 g of $Fe(NO_3)_3$, 1.4 g of $Ni(NO_3)_2$ are dissolved in 300 ml of distilled water and slowly dropped in a solution containing 7.7 g of citric acid dissolved in 400 ml of ethylene glycol. After mixing, the resulting solution is heated at 90° C. for 4 h. The evaporation of water from the solution brings to the formation of a sol (colloidal solution with micrometric micelles). The catalyst is dried in oven at 90° C. then the oven temperature is increased to 180° C. over night. In this step, a gel is formed and dried. The obtained solid is calcined at 500° C. for 4 h and then at 900° C. for 12 h. The XRD shows the perovskite cubic pattern (FIG. 1) and the surface area after calcination is 8 m²/g.

Example 4

$LaFe_{0.95}Rh_{0.05}O_3$ (Comparative Example)

5.3 g of $La(NO_3)_3$, 6.3 g of $Fe(NO_3)_3$, and 0.84 g of Rh nitrate solution 10% w/w are dissolved in 300 ml of distilled water and slowly dropped in a solution containing 7.7 g of citric acid dissolved in 400 ml of ethylene glycol. After mixing, the resulting solution is heated at 90° C. for 4 h. The evaporation of water from the solution brings to the formation of a sol (colloidal solution with micrometric micelles). The catalyst is dried in oven at 90° C. then the oven temperature is increased to 180° C. over night. In this step, a gel is and dried. The solid obtained is calcined at 500° C.

for 4 h and then at 900° C. for 12 h. The XRD shows the perovskite cubic pattern (FIG. 1) and the surface area after calcination is 5 m$^2$/g.

Example 5

$La_{0.8}Ce_{0.2}Fe_{0.7}Ni_{0.3}O_3$ (Invention)

4.3 g of La(NO$_3$)$_3$, 1.4 g Ce(NO$_3$)$_3$, 4.6 g of Fe(NO$_3$)$_3$, 1.4 g of Ni(NO$_3$)$_2$ are dissolved in 400 ml of distilled water and slowly dropped in a solution containing 9.5 g of citric acid dissolved in 500 ml of ethylene glycol. After mixing, the resulting solution is heated at 90° C. for 4 h. The evaporation of water from the solution brings to the formation of a sol (colloidal solution with micrometric micelles). The catalyst is dried in oven at 90° C. then the oven temperature is increased to 180° C. over night. In this step, a gel is formed and dried. The solid obtained is calcined at 500° C. for 4 h and then at 900° C. for 12 h. The XRD shows the perovskite cubic pattern and the reflection of the CeO$_2$ phase (FIG. 2). The surface area after calcination is 10 m$^2$/g.

The same CPO material can be obtained by solid state reaction. The precursors chosen are La$_2$O$_3$, Fe$_2$O$_3$, Ce$_2$(CO$_3$)$_3$,xH$_2$O and 2NiCO$_3$,3Ni(OH)$_2$,4H$_2$O. The oxides and carbonates are ball mixed during one hours in alcohol or water. After drying at 50° C. the mixture is calcined at 900° C. during 12 hr. The XRD shows the perovskite cubic pattern and the reflection of the CeO$_2$ phase (FIG. 2). The surface area after calcination is less than 5 m$^2$/g. The powder could be attrited after calcination to increase the surface area around 8-10 m$^2$/g.

Example 6

Figure 3:
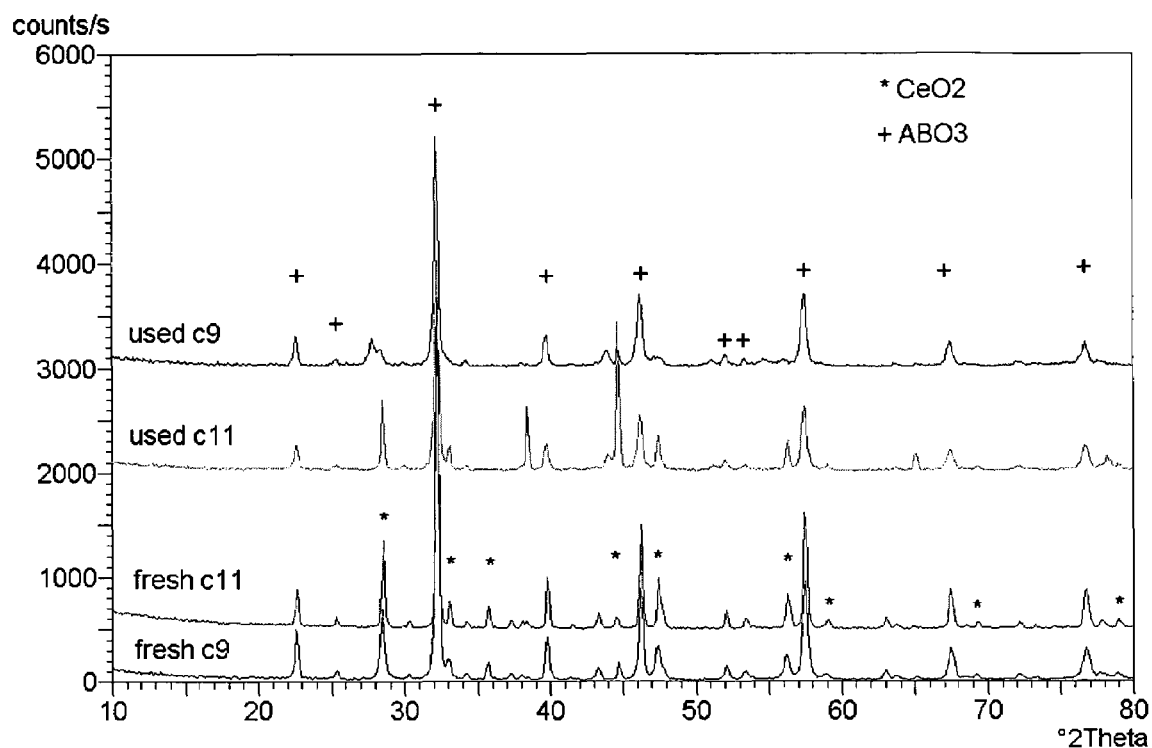
FIG. 3 discloses XRD patterns of $La_{0.8}Ce_{0.2}Fe_{0.7}Ni_{0.25}Rh_{0.05}O_3$ catalysts after calcination at 900° C and 1100° C.

The catalyst of the example 2 was analysed by XRD after reaction and after calcination at 1100° C. and reaction (FIG. 3). FIG. 3 discloses XRD patterns of La$_{0.8}$Ce$_{0.2}$Fe$_{0.7}$Ni$_{0.25}$Rh$_{0.05}$O$_3$ catalysts after calcination at 900° C. and 1100° C. (fresh C9 and C1) before reaction and after CPO tests (used C9 and C11)/(+) ABO$_3$ perovskite structure, (*) CeO$_2$ compound. The XRD reported show that the calcined at 1100° C. and the reaction does not change the phase composition. In all cases the perovskite structure and a CeO$_2$ side phase are detected. These analyses confirm the stability of the catalyst at high temperature (>1000° C.) and in hard reaction conditions. The catalyst does not show the Ni and Rh crystal due to the dispersion of the metals on the catalyst surface.

Results

After reduction of the catalysts under a mixture of N$_2$ and H$_2$ at 750° C./1 hr, the materials were tested in CPO reactions. The reduction is useful to have immediately the catalyst in its maximum of activity without waiting for stabilisation and to avoid that part of the catalyst is still oxidised. This activation period (time during which the active phase will be form under reductive conditions) could also be obtained under time on stream with the initial mixture methane/oxygen.

The tests were carried out in a fixed bed quartz microreactor of 8 mm of diameter, loaded with 1.50 g in granules (20-30 mesh). The tests were carried out at atmospheric pressure in three different conditions of feed and two different oven temperature: methane/oxygen/helium 2/1/20 and 2/1/4 v/v at 500° C. and 750° C. (residence time=0.2 s) and methane/oxygen/helium 2/1/1 at 750° C. (residence time=0.33 s). The reaction products were analysed by gas chromatography. All the catalyst in all the conditions shows total oxygen conversion. The initial temperature is the temperature of the gas mixture at the beginning of the catalytic bed. The temperature maximal (T$_{max}$) is the temperature measured at the end of the catalytic bed.

CPO tests of LaFe$_{0.7}$Ni$_{0.25}$Rh$_{0.05}$O$_3$ (Example 1)

The catalyst prepared in the example 1, LaFe$_{0.7}$Ni$_{0.25}$Rh$_{0.05}$O$_3$, is tested under CPO conditions. At low temperature the catalyst behaviour leads to the total combustion products. The methane conversion and the CO and H$_2$ is high at high temperature (750° C.) since the catalyst requires high temperature to be activated.

The test were carried out using methane/oxygen/helium 2/1/20 and 2/1/4 v/v at 500° C. and 750° C. with residence time of 0.2 s, and methane/oxygen/helium 2/1/1 at 750° C. with a residence time of 0.33 s.

| Gas mixture (CH$_4$/O$_2$/He) | Initial Temperature (° C.) | Conv. CH$_4$ (%) | Sel. CO (%) | Sel. H$_2$ (%) | T$_{max}$ (° C.) |
|---|---|---|---|---|---|
| 2/1/20 | 500 | 27.2 | 2.5 | 5 | 598 |
| 2/1/4 | 500 | 54.1 | 58.9 | 83.9 | 733 |
| 2/1/20 | 750 | 92.4 | 93.2 | 90.9 | 802 |
| 2/1/4 | 750 | 82.2 | 91.9 | 92.2 | 867 |

CPO Tests of La$_{0.8}$Ce$_{0.2}$Fe$_{0.7}$Ni$_{0.25}$Rh$_{0.05}$O$_3$ (Example 2)

The catalyst prepared in the example 2, La$_{0.8}$Ce$_{0.2}$Fe$_{0.7}$Ni$_{0.25}$Rh$_{0.05}$O$_3$, is tested under CPO conditions. The reaction shows an increase of catalytic activity with respect to the example 1 at low temperature in diluted conditions but is higher also in hard reaction conditions. This is due to the effects of the Ce which promotes the reduction of the catalyst.

The test were carried out using methane/oxygen/helium 2/1/20 and 2/1/4 v/v at 500° C. and 750° C. with residence time of 0.2 s, and methane/oxygen/helium 2/1/1 at 750° C. with a residence time of 0.33 s.

No deactivation of the catalyst is observed after return to initial conditions (500° C., 2/1/20).

| Gas mixture (CH$_4$/O$_2$/He) | Initial Temperature (° C.) | Conv. CH$_4$ (%) | Sel. CO (%) | Sel. H$_2$ (%) | T$_{max}$ (° C.) |
|---|---|---|---|---|---|
| 2/1/20 | 500 | 53.6 | 30.4 | 65.8 | 646 |
| 2/1/20 | 750 | 93.6 | 92.9 | 88 | 807 |
| 2/1/4 | 750 | 88 | 94.4 | 91.8 | 880 |
| 2/1/1 | 750 | 86.9 | 93.6 | 91.7 | 890 |
| 2/1/20 | *500° C.-Ret | 55.5 | 30.8 | 71.1 | 640 |

*500° C. ret. is a test carried out at 500° C. 2/1/20 to confirm the result of the first test after all the test CPO Tests of LaFe$_{0.7}$Ni$_{0.3}$O$_3$ (Example 3, as Comparison)

The catalyst prepared in the example 3 LaFe$_{0.7}$Ni$_{0.3}$O$_3$. This catalyst shows low activity at low and high temperature due to the not complete reduction of the Ni. The test were carried out using methane/oxygen/helium 2/1/20 and 2/1/4 v/v at 500° C. and 750° C. with residence time of 0.2 s, and methane/oxygen/helium 2/1/1 at 750° C. with a residence time of 0.33 s.

| Gas mixture (CH$_4$/O$_2$/He) | Initial Temperature (° C.) | Conv. CH$_4$ (%) | Sel. CO (%) | Sel. H$_2$ (%) | T$_{max}$ (° C.) |
|---|---|---|---|---|---|
| 2/1/20 | 500 | 26.2 | 0 | 0 | 554 |
| 2/1/20 | 500 | 32.5 | 20.1 | 48 | 762 |
| 2/1/20 | 750 | 60.3 | 71.8 | 78.8 | 769 |
| 2/1/4 | 750 | 64 | 80.4 | 91.2 | 872 |

CPO Tests of LaFe$_{0.95}$Rh$_{0.05}$O$_3$ (Example 4 as Comparison)

The catalyst prepared in the example 4, LaFe$_{0.95}$Rh$_{0.05}$O$_3$. The catalyst shows a methane conversion and CO and H$_2$ selectivities very low in all reaction conditions. This is due to the fact that the catalyst is not reduced during the activation step in hydrogen flow or in the reaction conditions (methane/oxygen/helium 2/1/20 and 2/1/4 v/v at 500° C. and 750° C. (residence time=0.2 s) and methane/oxygen/helium 2/1/1 at 750° C. (residence time=0.33 s).

| Gas mixture (CH$_4$/O$_2$/He) | Initial Temperature (° C.) | Conv. CH$_4$ (%) | Sel. CO (%) | Sel. H$_2$ (%) | T$_{max}$ (° C.) |
|---|---|---|---|---|---|
| 2/1/20 | 500° C. | 27.9 | 8.3 | 27.7 | 578 |
| 2/1/20 | 750° C. | 36.9 | 31.2 | 39.9 | 827 |

Aging CPO Tests of La$_{0.8}$Ce$_{0.2}$Fe$_{0.7}$Ni$_{0.25}$Rh$_{0.05}$O$_3$ (Example 2)

Figure 4:
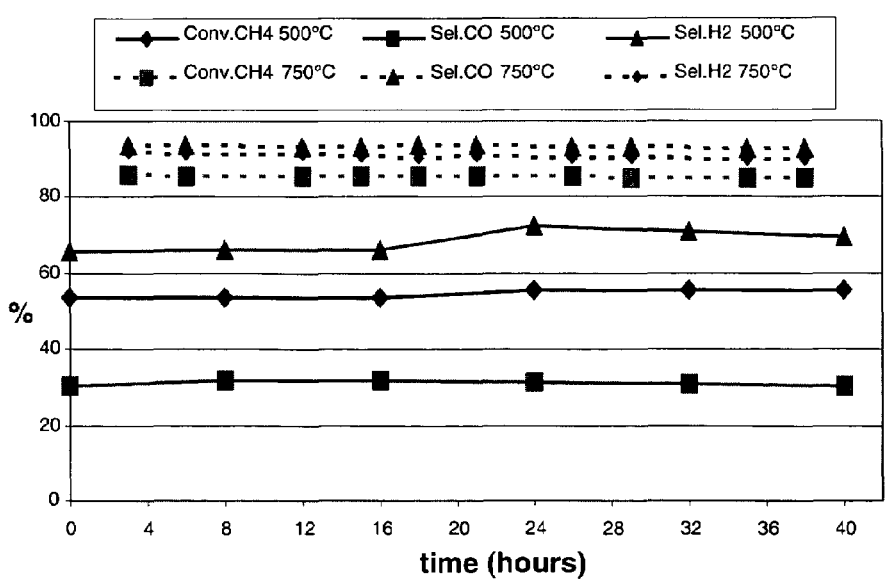
FIG. 4 discloses CPO tests of $La_{0.8}Ce_{0.2}Fe_{0.7}Ni_{0.25}Rh_{0.05}O_3$ catalyst under time on stream at 500 and 750° C.

The catalytic results of duration tests of the catalyst prepared as in example 2 (La$_{0.8}$Ce$_{0.2}$Fe$_{0.7}$Ni$_{0.25}$Rh$_{0.05}$O$_3$) are reported in FIG. 4. FIG. 4 discloses CPO tests (conversion, selectivity) of La$_{0.8}$Ce$_{0.2}$Fe$_{0.7}$Ni$_{0.2}$Rh$_{0.05}$O$_3$ catalyst under time on stream at 500 and 750° C. The test were carried out using methane/oxygen/helium 2/1/20 and 2/1/4 v/v at 500° C. and 750° C. with respectively residence time of 0.2 s.

In all cases no deactivation are observed under time on stream. At 750° C. the methane conversion is around 90%, the CO and hydrogen selectivities respectively 94 and 92%. The results were compared with those of a commercial catalysts Pt 0.5% wt on alfa Al$_2$O$_3$ calcined at 900° C. (0.5% wt Pt/(α-Al$_2$O$_3$). The results of the duration tests of the commercial catalyst are carried out in the same conditions of the CPO tests of La$_{0.8}$Ce$_{0.2}$Fe$_{0.7}$Ni$_{0.25}$Rh$_{0.05}$O$_3$. The comparisons between the two catalysts are described in the next table. The perovskite CPO material presents the same performances and stability as the commercial product.

| Gas mixture (CH$_4$/O$_2$/He) | Initial Temperature (° C.) | Time on stream (hr) | Conv. CH$_4$ (%) | Sel. CO (%) | Sel. H$_2$ (%) | T$_{max}$ (° C.) |
|---|---|---|---|---|---|---|
| Commercial catalyst: Pt (0.5 wt %)/α-Al$_2$O$_3$ | | | | | | |
| 2/1/20 | 500° C. | 1 | 44.7 | 31.2 | 76.5 | 614 |
| 2/1/20 | 500° C. | 40 | 37.7 | 24.2 | 65.8 | 620 |
| 2/1/4 | 750° C. | 1 | 91.2 | 96.6 | 92.6 | 842 |
| 2/1/4 | 750° C. | 40 | 87.7 | 95.7 | 93.4 | 935 |
| Perovskite catalyst: La$_{0.8}$Ce$_{0.2}$Fe$_{0.7}$Ni$_{0.25}$Rh$_{0.05}$O$_3$ | | | | | | |
| 2/1/20 | 500 | 1 | 53.6 | 30.4 | 65.8 | 646 |
| 2/1/20 | 500 | 40 | 56.0 | 31.0 | 67.0 | 650 |
| 2/1/4 | 750 | 1 | 88 | 94.4 | 91.8 | 880 |
| 2/1/4 | 750 | 40 | 86.9 | 93.6 | 91.7 | 890 |

The advantages of the perovskite catalysts are the thermal stability in hard reaction conditions the high activity at short residence time and the presence of synergetic effect among Rh and Ni.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A catalytic composition for partial oxidation of light hydrocarbon mixtures, comprising:
   a perovskite crystallographic structure comprising a formula (I):

$[A_zA'_{1-z}][B_{1-x-y}Ni_xRh_y]O_{3-\delta}$.

wherein said A and said A' each comprise at least one component selected from the group consisting of the lanthanide family, the actinide family, and group IIa,
   wherein said B is at least one component selected from the transition metal groups of columns Ib, IIb, IIIb, IVb, Vb, VIb, VIIb, and VIIIb,
   wherein $0<x\leq0.7$,
   wherein $0<y\leq0.5$,
   wherein $0<x+y\leq0.8$,
   wherein $0<z<1$, and
   wherein said δ is adjusted so as to obtain an electric neutrality of said perovskite compound.

2. The composition according to claim 1, wherein said A and said A' each comprise at least one component selected from the group consisting of:
   i) La;
   ii) Ce;
   iii) Ca; and
   iv) Sr.

3. The composition according to claim 2, wherein said A is La.

4. The composition according to claim 1, wherein said B is at least one component selected from the group consisting of:
   i) Mn;
   ii) Fe;
   iii) Co; and
   iv) Al.

5. The composition according to claim 1, wherein said perovskite crystallographic structure comprises formula (Ia):

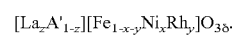
   $[La_zA'_{1-z}][Fe_{1-x-y}Ni_xRh_y]O_{3\delta}$.

6. The composition according to claim 5, wherein said formula (Ia) comprises La Fe$_{0.7}$ Ni$_{0.25}$ Rh$_{0.05}$ O$_{3\delta}$.

7. The composition according to claim 1, wherein said perovskite crystallographic structure comprises formula (Ib):

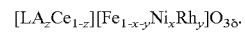
   $[LA_zCe_{1-z}][Fe_{1-x-y}Ni_xRh_y]O_{3\delta}$.

8. The composition according to claim 7, wherein said formula (Ib) comprises $La_{0.8}Ce_{0.2}Fe_{0.7}Ni_{0.25}Rh_{0.05}O_{3\delta}$.

9. The composition according to claim 1, wherein $0<x\leq0.5$.

10. The composition according to claim 1, wherein $0<y\leq0.25$.

11. The composition according to claim 1, wherein $z<1$.

12. The composition according to claim 1, wherein said partial oxidation of light hydrocarbon mixtures occurs when an operating temperature of the catalyst is in the range of about 500 to about 1300° C.

13. The composition according to claim 12, wherein said operating temperature of the catalyst is in the range of about 600 to about 1100° C.

14. The composition according to claim 1, wherein said partial oxidation of light hydrocarbon mixtures occurs when an operating pressure of the catalyst is in the range of about $10^5$ Pa to about $3\times10^6$ Pa.

15. The composition according to claim 14, wherein said operating pressure of the catalyst is in the range of about $10^5$ Pa to about $10^6$ Pa.

16. The composition according to claim 1, wherein said partial oxidation of light hydrocarbon mixtures occurs when at least one oxidant gaseous feed is combined with said light hydrocarbon mixtures, and wherein said oxidant gaseous feed is at least one of:
   i) oxygen;
   ii) oxygen and an inert gas mixture; and
   iii) steam and carbon dioxide.

17. The composition according to claim 1, wherein said light hydrocarbon mixture to be partially oxidized further comprises natural gas.

18. A method for making a catalytic composition for the partial oxidation of light hydrocarbon mixtures, comprising:
   preparing an aqueous solution comprising a salt comprising A, a salt comprising A', a salt comprising B, a salt comprising Ni, and a salt comprising Rh;
   combining said aqueous solution with an acid;
   evaporating said aqueous solution to form a sol;
   drying said sol to form a perovskite crystallographic structure comprising formula (I):

$[A_zA'_{1-z}][B_{1-x-y}Ni_xRh_y]O_{3\delta}$.

wherein said A and said A' each comprise at least one component selected from the group consisting of the lanthanide family, the actinide family, and group IIa,
   wherein said B is at least one component selected from the transition metal groups Ib, IIb, IIIb, IVb, Vb, VIb, VIIb, and VIIIb,
   wherein $0<x\leq0.7$,
   wherein $0<y\leq0.5$,
   wherein $0<x+y\leq0.8$,
   wherein $0\leq z\leq1$, and
   wherein said δ is adjusted so as to obtain an electric neutrality of said perovskite compound.

19. The method according to claim 18, wherein said A and said A' each comprise at least one component selected from the group consisting of:
   i) La;
   ii) Ce;
   iii) Ca; and
   iv) Sr.

20. The method according to claim 19, wherein said A is La.

21. The method according to claim 18, wherein said B is at least one component selected from the group consisting of:
   i) Mn;
   ii) Fe;
   iii) Co; and
   iv) Al.

22. The method according to claim 18, wherein said perovskite crystallographic structure comprises formula (Ia):

$[La_zA'_{1-z}][Fe_{1-x-y}Ni_xRh_y]O_{3\delta}$.

23. The method according to claim 22, wherein said perovskite crystallographic structure comprises $LaFe_{0.7}Ni_{0.25}Rh_{0.05}O_{3\delta}$.

24. The method according to claim 18, wherein said perovskite crystallographic structure comprises formula (Ib):

$[La_zCe_{1-z}][Fe_{1-x-y}Ni_xRh_y]O_{3\delta}$.

25. The method according to claim 24, wherein said perovskite crystallographic structure comprises $La_{0.8}Ce_{0.2}Fe_{0.7}Ni_{0.25}Rh_{0.05}O_{3\delta}$.

26. The method according to claim 18, wherein $0<x\leq0.5$.

27. The method according to claim 18, wherein $\alpha<y\leq0.25$.

28. The method according to claim 18, wherein $z<1$.

29. A method for the partial oxidation of light hydrocarbon mixtures, comprising:
   providing a feed comprising said light hydrocarbon mixtures; and
   contacting said feed with a catalyst comprising a perovskite crystallographic structure comprising formula (I):

$[A_zA'_{1-z}][B_{1-x-y}Ni_xRh_y]O_{3\delta}$.

wherein said A and said A' each comprise at least one component selected from the group consisting of the lanthanide family, the actinide family, and group IIa,
   wherein said B is at least one component selected from the transition metal groups Ib, IIb, IIIb, IVb, Vb, VIb, VIIb, and VIIIb,
   wherein $0<x\leq0.7$,
   wherein $0<y\leq0.5$,
   wherein $0<x+y\leq0.8$,
   wherein $0\leq z\leq1$, and
   wherein said δ is adjusted so as to obtain an electric neutrality of said perovskite compound.

30. The method according to claim 29, further comprising maintaining said catalyst at a temperature between about 500° C. and about 1300° C.

31. The method according to claim 30, wherein said temperature is between about 600° and about 1100° C.

32. The method according to claim 29, wherein said method is carried out under a pressure between about $10^5$ Pa and about $3\times10^6$ Pa.

33. The method according to claim 32, wherein said pressure is between about $10^5$ Pa and about $10^6$ Pa.

34. The method according to claim 29, wherein said feed further comprises an oxidant comprising at least one of:
   i) oxygen;
   ii) oxygen and an inert gas mixture; and
   iii) steam and carbon dioxide.

* * * * *

UNITED STATES PATENT AND TRADEMARK OFFICE
CERTIFICATE OF CORRECTION

PATENT NO. : 7,329,691 B2
APPLICATION NO. : 10/712691
DATED : February 12, 2008
INVENTOR(S) : F. Basile et al.

Page 1 of 1

It is certified that error appears in the above-identified patent and that said Letters Patent is hereby corrected as shown below:

In Column 8, line 38 claim 1, replace "$0<z<1$" with --$0\leq z\leq 1$--.

In Column 8, line 60 and Column 10, line 12 claim 5, replace the formula "$[La_zA'_{1-z}][Fe_{1-x-y}Ni_xRh_y]O_{3\delta}$" with --$[La_zA'_{1-z}][Fe_{1-x-y}Ni_xRh_y]O_{3-\delta}$--.

In Column 8, line 62 and Column 10, line 14 claim 6, replace the formula "La $Fe_{0.7}$ $Ni_{0.25}$ $Rh_{0.05}$ $O_{3\delta}$" with --La $Fe_{0.7}$ $Ni_{0.25}$ $Rh_{0.05}$ $O_{3-\delta}$--.

In Column 8, line 66 and Column 10, line 19 claim 7, replace the formula "$[LA_zCe_{1-z}][Fe_{1-x-y}Ni_xRh_y]O_{3\delta}$" with --$[LA_zCe_{1-z}][Fe_{1-x-y}Ni_xRh_y]O_{3-\delta}$--.

In Column 9, line 2 and Column 10, line 22 claim 8, replace the formula "$La_{0.8}$ $Ce_{0.2}$ $Fe_{0.7}$ $Ni_{0.25}$ $Rh_{0.05}$ $O_{3\delta}$" with --$La_{0.8}$ $Ce_{0.2}$ $Fe_{0.7}$ $Ni_{0.25}$ $Rh_{0.05}$ $O_{3-\delta}$--.

In Column 9, line 43 and Column 10, line 34 claim 18, replace the formula "$[A_zA'_{1-Z}][B_{1-x-y}Ni_xRh_y]O_{3\delta}$" with --$[A_zA'_{1-Z}][B_{1-x-y}Ni_xRh_y]O_{3-\delta}$--.

In Column 10, line 24 claim 27, replace "$\alpha<y\leq 0.25$" with --$0<y\leq 0.25$--.

Signed and Sealed this

Twenty-seventh Day of April, 2010

David J. Kappos
*Director of the United States Patent and Trademark Office*